(12) United States Patent
Azema

(10) Patent No.: US 7,131,801 B2
(45) Date of Patent: Nov. 7, 2006

(54) SEPARATION DEVICE BETWEEN THE MACHINING STATION AND A MACHINE TOOL DRIVING STATION

(76) Inventor: André Azema, "Le Mercadel", Longuegineste, F-81710 Saix (FR)

( * ) Notice: Subject to any disclaimer, the term of this patent is extended or adjusted under 35 U.S.C. 154(b) by 256 days.

(21) Appl. No.: 10/467,205

(22) PCT Filed: Feb. 5, 2002

(86) PCT No.: PCT/FR02/00434

§ 371 (c)(1),
(2), (4) Date: Aug. 5, 2003

(87) PCT Pub. No.: WO02/062522

PCT Pub. Date: Aug. 15, 2002

(65) Prior Publication Data

US 2004/0057805 A1    Mar. 25, 2004

(30) Foreign Application Priority Data

Feb. 5, 2001 (FR) .................................. 01 01478

(51) Int. Cl.
*B23Q 11/08* (2006.01)

(52) U.S. Cl. .................. 409/134; 409/137; 409/203; 408/53; 408/67; 29/DIG. 56; 160/120

(58) Field of Classification Search ................ 409/134, 409/137, 192, 203, 213; 408/42, 53, 67, 408/241 G; 74/608, 609; 29/DIG. 56, DIG. 59, 29/DIG. 60, DIG. 94; 160/120, 122, 241; 384/15
See application file for complete search history.

(56) References Cited

U.S. PATENT DOCUMENTS 3,306,344 A * 2/1967 Youngs ...................... 160/241

(Continued)

FOREIGN PATENT DOCUMENTS

EP          0 985 489 A2    3/2000

(Continued)

*Primary Examiner*—Monica Carter
*Assistant Examiner*—Michael W. Talbot
(74) *Attorney, Agent, or Firm*—Akerman Senterfitt; Stephan A. Pendorf; Peter A. ChiaBotti

(57) ABSTRACT

A partitioning device between a machining station and a machine-tool driving station of the type driving at least two tool-holder rams is provided. The device includes a flexible curtain, called a central curtain, between two rams, where two ends are integral with a first ram and which is linked to the second ram. The relative movement of one ram with respect to the other along a first axis of movement, stretches more or less a length of curtain between the two rams.

9 Claims, 4 Drawing Sheets

U.S. PATENT DOCUMENTS

| | | | |
|---|---|---|---|
| 3,490,815 A * | 1/1970 | Poston | 384/15 |
| 3,824,890 A * | 7/1974 | Zettler et al. | 409/134 |
| 4,597,698 A * | 7/1986 | Liebetrau | 409/134 |
| 4,768,902 A * | 9/1988 | Rutschle et al. | 409/134 |
| 4,863,319 A * | 9/1989 | Winkler et al. | 409/134 |
| 4,936,174 A * | 6/1990 | Holy et al. | 82/117 |
| 4,966,505 A * | 10/1990 | Winkler et al. | 409/134 |
| 5,056,969 A * | 10/1991 | Nerland et al. | 409/134 |
| 5,235,874 A * | 8/1993 | Tabellini | 74/608 |
| 5,365,991 A * | 11/1994 | Wright et al. | 160/84.04 |
| 6,067,877 A * | 5/2000 | Kato | 74/608 |
| 6,120,223 A * | 9/2000 | Hirose et al. | 409/134 |
| 6,161,992 A * | 12/2000 | Holy et al. | 409/134 |
| 6,276,427 B1 * | 8/2001 | Eisner | 160/133 |
| 6,457,918 B1 * | 10/2002 | Green | 409/134 |
| 6,568,885 B1 * | 5/2003 | Green | 409/134 |
| 2002/0009343 A1 * | 1/2002 | Uetake et al. | 409/134 |
| 2003/0121362 A1 * | 7/2003 | Goellner | 74/608 |

FOREIGN PATENT DOCUMENTS

| | | | |
|---|---|---|---|
| EP | 1533073 A1 * | 5/2005 | |
| FR | 2800000 A1 * | 4/2001 | |
| GB | 2268562 A * | 1/1994 | |
| JP | 61-103753 | 5/1986 | |
| JP | 02015946 A * | 1/1990 | |
| JP | 04 315546 A | 11/1992 | |
| JP | 2000084712 A * | 3/2000 | |
| JP | 2000084787 A * | 3/2000 | |
| JP | 2000-202733 | 7/2000 | |
| JP | 2001015274 A * | 1/2001 | |
| WO | 99/33608 | 7/1999 | |

* cited by examiner

SEPARATION DEVICE BETWEEN THE MACHINING STATION AND A MACHINE TOOL DRIVING STATION

CROSS REFERENCE TO RELATED APPLICATION

This application is a national stage of PCT/FR02/00434 filed Feb. 5, 2002 and based upon French Application 01/01478 filed Feb. 5, 2001 under the International Convention.

AREA OF APPLICATION OF THE INVENTION

The present invention relates to the field of high-speed machine tools of the type that employ two tool holder rams, and especially adaptations that permit separation of the machining station of this type of machine tool from its driving station.

DESCRIPTION OF THE PRIOR ART

The design of high-speed machine tools of the type that move two tool holder rams (so-called double spindles) has required the development of new means of separation between the machining station proper and the driving station. The different existing cowlings were specially adapted to follow a single moving device, not several.

Moreover, since the technique of linear drives has become generalized, separation between the machining station and the driving station must be particularly effective at the risk of seeing the chips produced by machining attracted by the magnetic fields and contaminating the drives and guides of the machine tool.

Machine tool designers have also conducted research to adapt the conventional means of separation to a machine tool of the double spindle type.

One of the design criteria for the cowlings resides in the maximum approach distance between the two rams. The closer the rams are capable of approaching, the more productive the machine tool will be, owing to the use of a common machining zone and its capacity to allow the two rams and the tools that they carry to function at the same time without interfering with each other.

Naturally, a technological solution utilizing the characteristics of bellows exists, but it cannot meet all the requirements and cannot be adapted to all machining applications.

In addition, the movements caused by kinematic structures that use linear motors have a speed such that bellows cannot open and close correctly. Moreover, the folds created by the bellows become storage zones for chips, which prevent proper functioning of these technological solutions.

DESCRIPTION OF THE INVENTION

With this state of affairs as a point of departure, the applicant conducted research, whose purpose was to design a technological solution to ensure separation between the machining station and the driving station of the high-speed machine tool of the type that drives at least two rams.

This research led to a particularly original separation device that optimally meets the requirements of approach of the two rams, while providing perfect sealing.

The separation device between the machining station and the driving station of a machine tool of the type that drives at least two tool holder rams advantageously consists, at least between the two rams, of a flexible curtain, called a central curtain, whose two ends are integral with a first ram and connected to the second one, so that the relative movement of one ram relative to the other extends along a first axis of movement by about one length of the curtain between the two rams.

This characteristic is particularly advantageous, in that it offers vertical separation between the machining station and the driving station of the machine tool, capable of being used for any machining application.

Moreover, its retraction permits this separation device to meet the requirement of minimum space between the two rams by means of a panel that deforms when the two rams approach. Continuous presentation of a vertical protection wall not only guarantees good separation of the two machining and driving stations of the machine tool, but also facilitates guiding of this wall, as well as sealing of this guide relative to the machine tool frame. Apart from technological solutions of the bellows type, it is particularly difficult to guarantee perfect sealing at the level of the space defined between the two rams.

The fundamental concepts of the invention just described above in their most elementary form, other details and characteristics, will follow more clearly on reading the following description with reference to the appended drawings, given as non-limiting examples of a variant of the separation device according to the invention.

DESCRIPTION OF PREFERRED VARIANTS

Figure 3B:
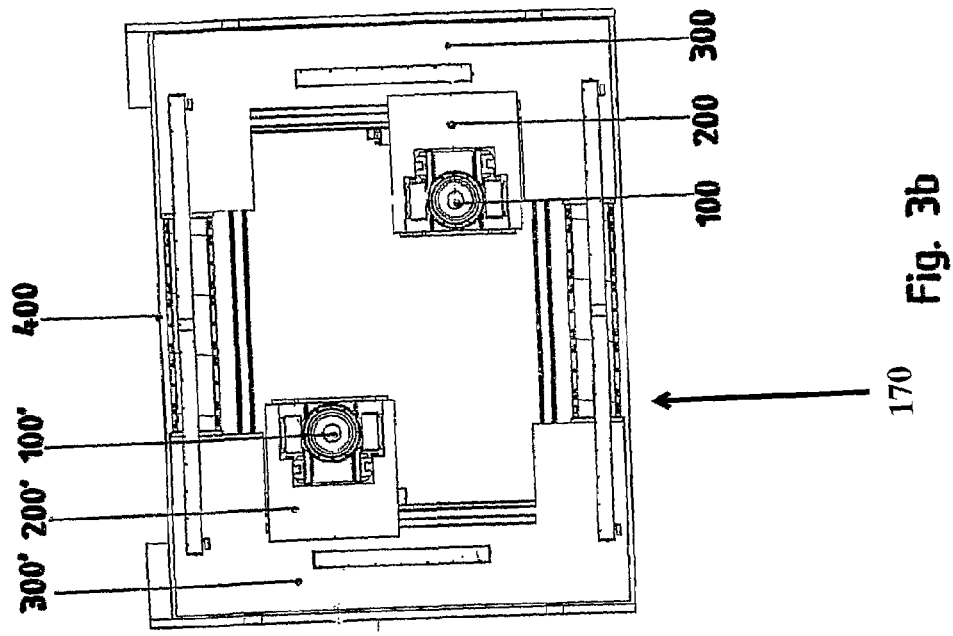
FIG. 3*b* is a front view of the machine tool of FIG. 3*a*.
Figure 3A:
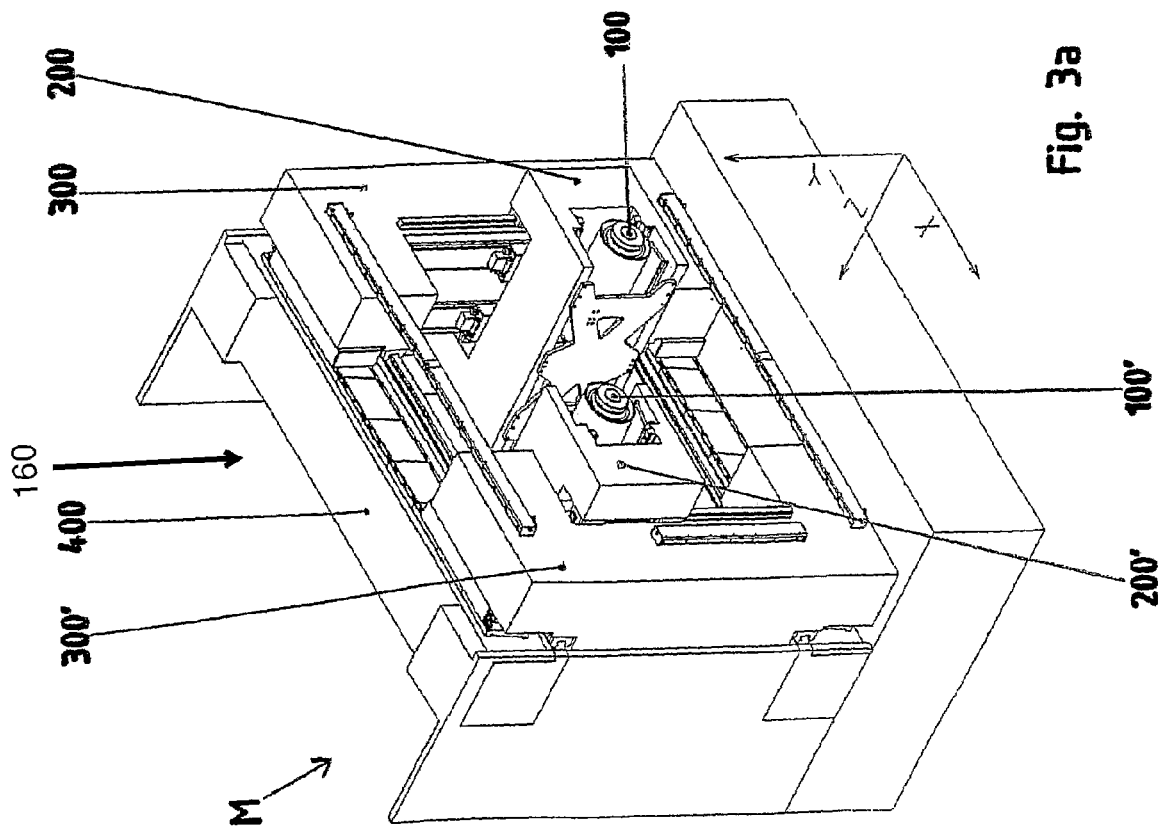
FIG. 3*a* is a front perspective view of a machine tool, to which the device of the invention could be adapted.

According to one preferred, non-limiting variant and to facilitate description of the device of the invention, the machine tool, on which the device of the invention will be considered to be installed, will be the one shown in FIGS. 3*a* and 3*b*. As shown in the drawings of FIGS. 3*a* and 3*b*, the machine tool denoted M in its entirety ensures movement of two rams 100 and 100' by means of a linear motor along the three illustrated axes X, Y and Z.

The objective of the device of the invention is to optimally ensure separation of the driving station (160) situated to the rear from the machining station (170) situated to the front of rams 100 and 100' which ensure driving of the machine tool in conventional fashion (not shown).

According to the depicted variant, said rams 100 and 100' are each mounted in a headstock 200 and 200', containing the means necessary to drive and guide rams 100 and 100' along the Z-axis. These headstocks 200 and 200' are each connected to a semi-table 300 and 300', which contains means of driving and guiding of said headstocks along the Y-axis. Finally, the two semi-tables 300 and 300' are connected to the same vertical frame 400, which contains the means necessary for driving and guiding said two semi-tables 300 and 300' along the X-axis.

Another objective of the device of the invention is to permit maximum approach of the two rams 100 and 100' along the X-axis.

Figure 4B:
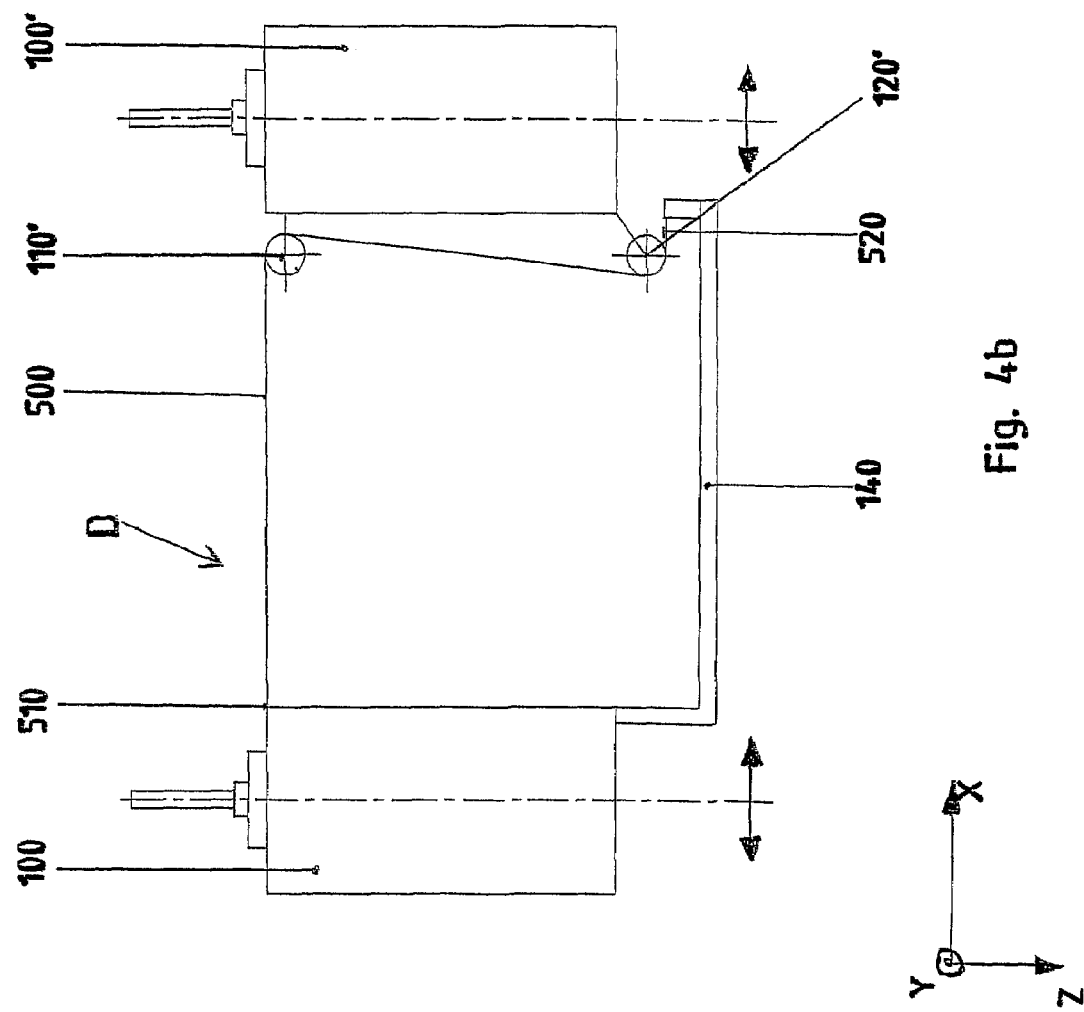
FIG. 4*b* is a schematic top view, illustrating the functioning principle of the separation device of the invention, connecting the two rams in the separated position.
Figure 4A:
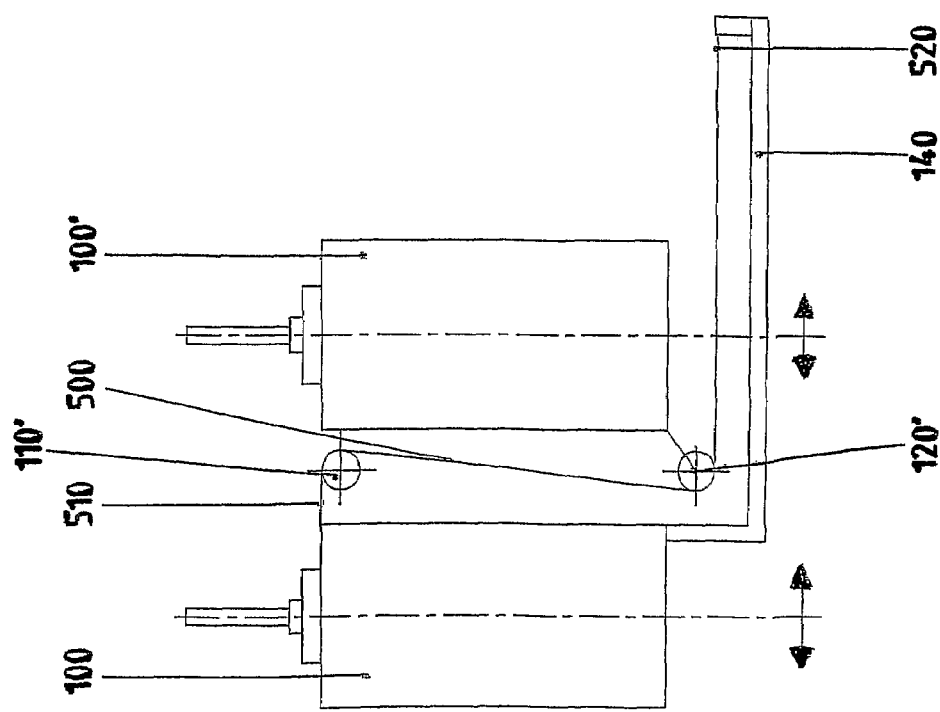
FIG. 4*a* is a schematic top view, illustrating the functioning principle of the separation device of the invention, connecting the two rams in the adjacent position.

According to the variant illustrated by the drawings in FIGS. 4a and 4b, the separation device of the invention, denoted D in its entirety, is characterized by the fact that it consists, at least between the two rams 100 and 100', of a flexible curtain 500, a so-called central curtain, whose two ends 510 and 520 are integral with a first ram 100, and which is connected to the second ram 100', so that the relative movement of a ram 100 or 100' relative to the other ram 100' or 100 along a first movement axis, i.e., the X-axis illustrated here, extends along the vertical plane defined by the X and Y axes by about one length of curtain 500 between the two rams 100 and 100'.

The device D of the invention has the advantage of continuously providing a flat vertical wall in plane P (X, Y), whatever the position of the two rams. Thus, as shown in the drawing of FIG. 4a, the two rams 100 and 100' are in the adjacent position and the length of the central curtain 500 separating the machining station (170) situated to the front of rams 100 and 100' and the driving station (160) situated to the rear is minimal, the unused length being retracted to the interior of the machine tool. When the rams 100 and 100' are separated from each other by common or relative movements, the second ram 100' deforms said curtain 500, so as to present a sufficient separation length between the two stations (160, 170) and between the two rams 100 and 100'.

According to a particularly advantageous characteristic, said central curtain 500 has a fixed length and is deformed by retracting to the interior of the machine tool M the unused length, when the two rams 100 and 100' approach each other, and deploys to the exterior of the machine tool M, when the two rams 100 and 100' are separated from each other. The implementation of a curtain of fixed length avoids the pulling or deformation due to different movements impressed along the X-axis on the two rams 100 or 100' by the driving station (160). Thus, the curtain 500 is instantaneously deployed or retracted, depending on whether the two rams 100 and 100' are separating from or approaching each other.

According to a preferred, but non-limiting variant, the second ram 100' has means of retraction 110' and 120', consisting of means of contact that cause the curtain 500 to pass from a vertical position perpendicular to the axes of the two rams 100 and 100', which are parallel to the Z-axis, to a vertical position parallel to said rams 100 and 100'.

According to the invention, each ram 100 and 100' contains on the common movement axis and on its outside a so-called lateral separation curtain that follows the movements of said ram on this axis.

Figure 1:
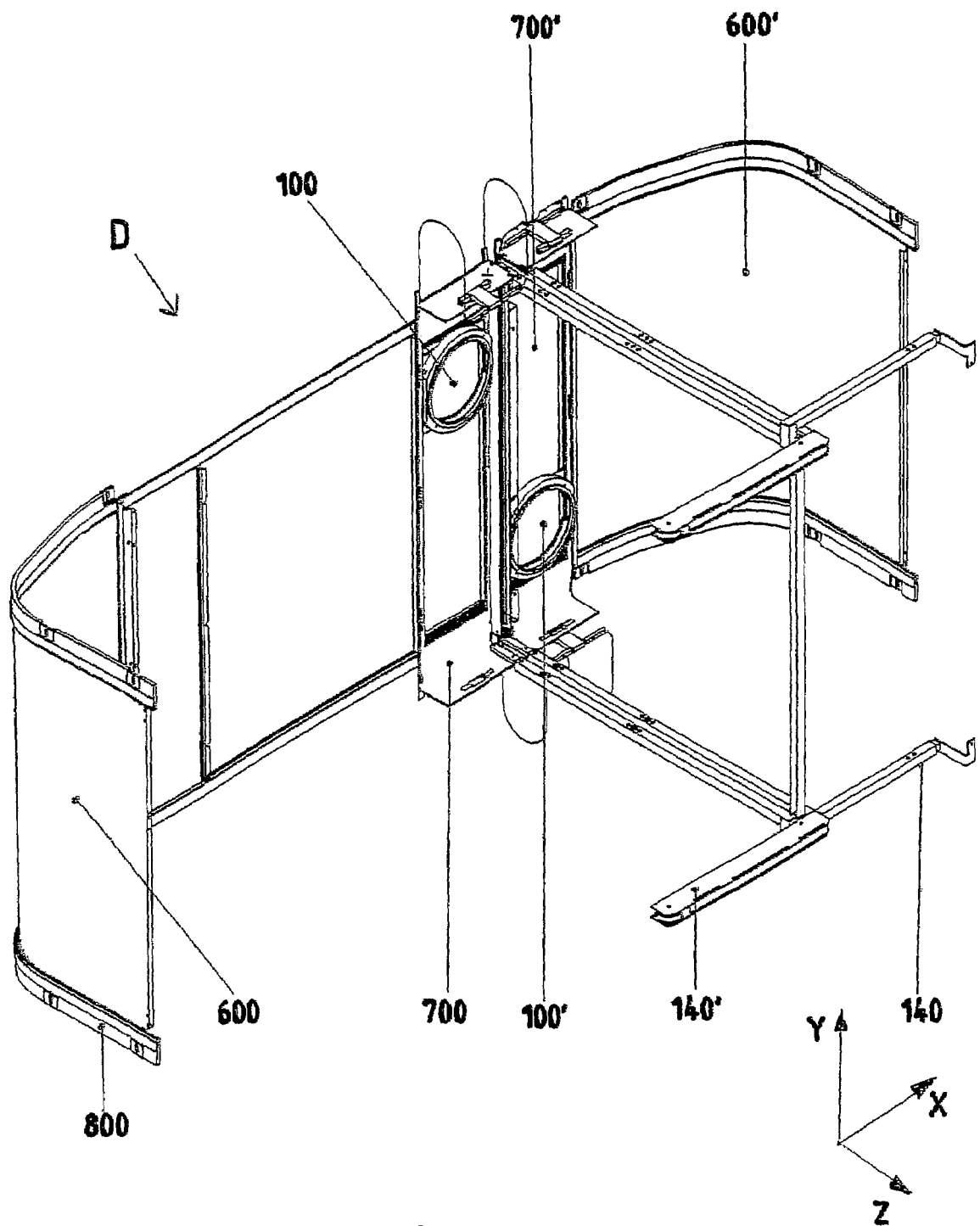
FIG. 1 is a rear perspective view of a variant of the device of the invention in the closed position, where the two rams are close to each other.
Figure 2:
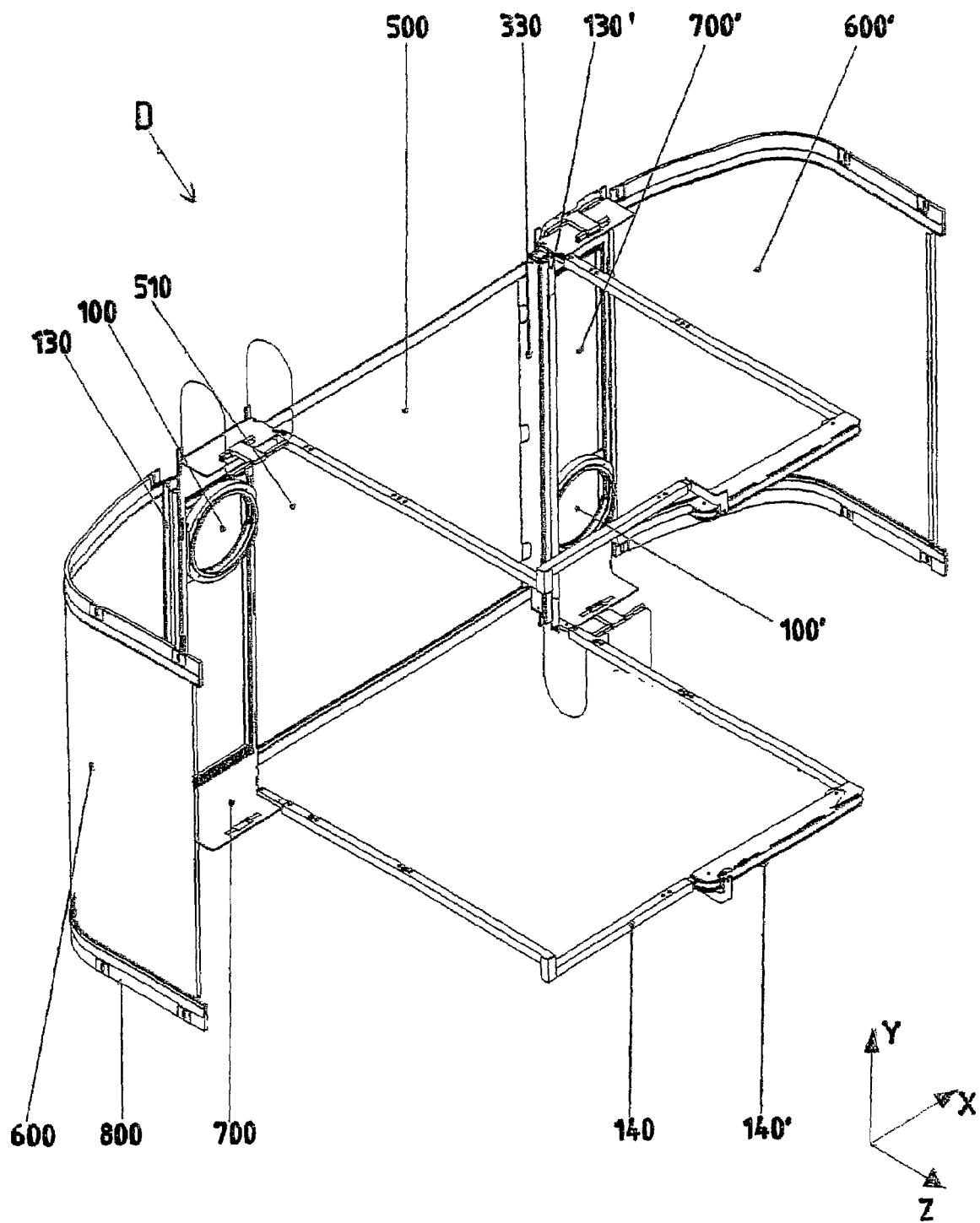
FIG. 2 is a rear perspective view of the device of FIG. 1 in the open position, where the two rams are separated from each other.

As shown in the drawings of FIGS. 1 and 2, the device D also consists of two makeup curtains 600 and 600' that function as lateral curtains, each connected to a ram 100 and 100', only the openings of which, prescribed for their effect in device D, are apparent, which ensures separation between the machining station (170) and the driving station (160), when a space is created during separation a ram 100 or 100' from the lateral wall of machine tool M.

Thus, the device D of the invention represents a complete solution for separation between the machining station (170) and the driving station (160).

To complement this separation solution, each ram 100 and 100' is connected to a mobile carriage 130 and 130', which, by ensuring connection to the ends of said curtains 500, 600 and 600', permits guiding of the other curtains 700 and 700', ensuring separation of said stations on a movement perpendicular to the former.

According to the depicted preferred, but non-limiting variant, device D also consists of a fixed carriage 800 that ensures guiding of said central and makeup curtains 500, 600, 600', driven by the movements of rams 100 and 100', to which they are associated relative to the frame of machine tool M.

According to the variant illustrated in the drawings of FIGS. 4a and 4b, the means of retraction 110' and 120' connected to the second ram 100' consist of rollers, a first one of which ensures passage of the curtain 500 from a vertical plane perpendicular to the axes of rams 100 and 100' to a vertical plane almost parallel to said axes, and a second one that causes said curtain 500 to pass from said almost parallel plane to another perpendicular plane, but within machine tool M.

Thus, when the two rams approach each other, the length of curtain 500 separating the two rams 100 and 100' diminishes to the front and increases to the interior or machine tool M. Inversely, when the two rams 100 and 100' separate from each other, the length of the curtain 500 separating the two rams 100 and 100' increases to the exterior and diminishes by the same amount to the interior of machine tool M, because the curtain has a fixed length.

According to the variant illustrated in FIGS. 4a and 4b, a first end 510 of the central curtains 500 is connected to the mobile carriage 130 of the first ram 100 and the second end 520 to an attachment tab 140 connected to the interior or machine tool M at the rear of said first ram 100. The attachment tab 140 has, for its length along the X-axis, the maximum length of the curtain front part. Thus, when the two rams come together, the curtain entrained by said tab is wound around the roller, so as to reduce its separation length between the two rams by the length of travel of the attachment tab 140.

The variant shown in the drawings of FIGS. 1 and 2 differs in that the means of retraction of curtain 500 are made by a contact device 330 for the first change in plane, i.e., from the vertical plane perpendicular to the axes of rams 100 and 100', to a vertical plane almost parallel to said axes. Moreover, each ram 100 and 100' contains an attachment tab 140 and 140'. According to the variant shown, said attachment tabs each have a length along the X-axis equal to half the maximum length of curtain 500, deployed when the two rams 100 and 100' are at maximum distance from each other.

Naturally, it is not essential that the end 520 of curtain 500 itself be fixed to tab 140, but a cable or other means of transmission of the movement can be, so as not to employ a curtain of unduly bulky length.

According to a particularly advantageous characteristic, each zone of a change in plane contains a means of sealing of the scraper joint type to avoid introduction of chips into the machine tool.

It is understood that the separation device D was just described and shown in order to divulge the invention rather than limit it. Naturally, various arrangements, modifications and improvements could be made to the aforementioned example without departing from the scope of the invention, taken in its broadest aspects and essence.

The invention claimed is:

1. A separation device for separating at least a first tool holder ram and a second tool holder ram, wherein said separation device comprises:

a central curtain comprising a first side and a second side, which are spaced along the direction of separation of the tool holder rams, wherein said first side of said central curtain is integral with said first ram and said second side of said central curtain is integral with said first ram, wherein said central curtain is linked to said second ram, wherein a length of said central curtain between said rams is equal to a distance of separation of either ram relative to said other ram along a first axis of movement.

2. A device according to claim 1, wherein said central curtain is of fixed length, and wherein said central curtain deforms by retracting its unused length to an interior of a machine tool when said two rams approach each other, and wherein said central curtain deforms by deploying its length to an exterior of machine tool, when said two rams separate from each other.

3. A device according to claim 1, wherein said second ram comprises a means of retraction comprising contact devices, and wherein said contact devices cause said central curtain to pass from a position parallel to said axis of movement to a position perpendicular to said axis.

4. A device according to claim 1, wherein each said ram comprises, on said first axis of movement and on its exterior, a lateral separation curtain that follows said ram on said first axis of movement.

5. A device according to claim 1, wherein said device comprises a first makeup curtain and a second makeup curtain, wherein said first makeup curtain and said second makeup curtain are each connected to one said ram, and wherein said makeup curtain is disposed between a machining station and a driving station when a space is created during separation of said ram from a lateral wall of a machine tool.

6. A device according to claim 1, wherein one said ram is connected to a first mobile carriage, and wherein other said ram is connected to a second mobile carriage, wherein each said mobile carriage connects with at least one side, of said central curtain and at least one side of said makeup curtains, wherein each said mobile carriage is adapted to guide at least one other curtain.

7. A device according to claim 1, wherein said device comprises a fixed carriage that is adapted to guide said central curtain and makeup curtains, and wherein said central curtain and said makeup curtains are adapted to be driven by the movements of said rams to which they are associated, relative to a frame of a machine tool.

8. A device according to claim 3, wherein said means of retraction comprises rollers.

9. A device according to claim 7, wherein said first side of said central curtain is connected to a mobile carriage of said first ram, wherein said second side is connected to an attachment tab, and wherein said attachment tab is connected to an interior of said machine tool to a rear of said first ram.

* * * * *

UNITED STATES PATENT AND TRADEMARK OFFICE
CERTIFICATE OF CORRECTION

PATENT NO. : 7,131,801 B2 Page 1 of 1
APPLICATION NO. : 10/467205
DATED : November 7, 2006
INVENTOR(S) : Andre Azema It is certified that error appears in the above-identified patent and that said Letters Patent is hereby corrected as shown below:

On the face of the patent:

Item [73] Assignee should read: RENAULT AUTOMATION COMAU, Trappes Cedex, France.

Signed and Sealed this

Twelfth Day of June, 2007

JON W. DUDAS
*Director of the United States Patent and Trademark Office*